June 30, 1925.
H. T. PRANGE
1,543,870
MAGNIFYING GLASS
Filed June 17, 1921
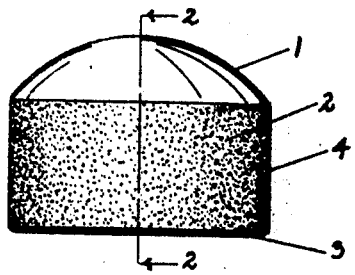
Fig. I.
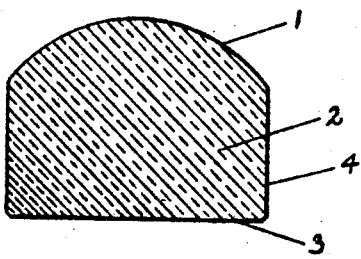
Fig. II.
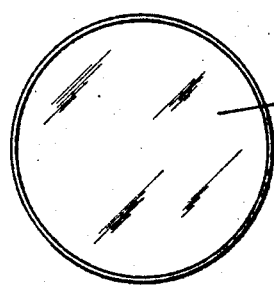
Fig. III.
Inventor
Henry T. Prange
By Chappell T Earl
Attorneys Patented June 30, 1925.

1,543,870

UNITED STATES PATENT OFFICE.

HENRY T. PRANGE, OF KALAMAZOO, MICHIGAN.

MAGNIFYING GLASS.

Application filed June 17, 1921. Serial No. 478,273.

*To all whom it may concern:*

Be it known that I, HENRY T. PRANGE, a citizen of the United States, residing at the city and county of Kalamazoo, State of Michigan, have invented certain new and useful Improvements in Magnifying Glasses, of which the following is a specification.

This invention relates to improvements in magnifying glasses.

The main objects of this invention are to provide an improved magnifying glass in which the lens and its supporting body are formed of a single piece of molded glass.

Further objects and objects relating to structural details, will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawings, forming a part of this application, in which:

Fig. I is a side view of my improved magnifying glass.

Fig. II is a vertical central section thereof on a line corresponding to line 2—2 of Fig. I.

Fig. III is a bottom view.

In the drawings, similar reference characters refer to similar parts throughout the several views.

Referring to the drawings, my improved magnifying glass comprises the curved lens portion 1 and the body portion 2 formed integrally therewith. The body and the lens are molded in a single piece, the depth of the body being such as to focus the lens when the bottom of the body is resting upon the surface to be magnified.

The body is cylindrical, its bottom 3 being a perfectly flat surface, the sides 4 of the body are ground, while the lens 1 and the bottom surface 3 are polished.

My improved lens is especially adapted for use on desks where it may be used as a paper weight and is of such body that it is not likely to be broken. It is very convenient as the lens is in focus when the glass is resting upon the surface to be magnified. My improved magnifying glass is also ornamental in appearance.

Having thus described my invention, what I claim as new and desire to secure by Letters Patent, is:

As an article of manufacture, a magnifying glass formed as a single molded piece, comprising a cylindrical body and a curved top constituting a lens, the depth of the body being such as to focus the lens when the body is resting upon the surface to be magnified, the lens surface and the bottom being unobstructed and polished throughout and the sides of the body being ground.

In witness whereof, I have hereunto set my hand and seal.

HENRY T. PRANGE. [L. S.]